(12) United States Patent
Thienst et al.

(10) Patent No.: US 11,987,461 B2
(45) Date of Patent: May 21, 2024

(54) DEVICE AND METHOD FOR SPLICING AND CONTINUOUSLY PROVIDING A FILM WEB

(71) Applicant: Harro Hoefliger Verpackungsmaschinen GmbH, Allmersbach im Tal (DE)

(72) Inventors: Andreas Thienst, Allmersbach im Tal (DE); Tim Walker, Allmersbach im Tal (DE)

(73) Assignee: Harro Hoefliger Verpackungsmaschinen GmbH, Allmersbach im Tal (DE)

( * ) Notice: Subject to any disclaimer, the term of this patent is extended or adjusted under 35 U.S.C. 154(b) by 308 days.

(21) Appl. No.: 17/462,810

(22) Filed: Aug. 31, 2021

(65) Prior Publication Data
US 2022/0081245 A1    Mar. 17, 2022

(30) Foreign Application Priority Data
Sep. 14, 2020   (EP) ..................................... 20196066

(51) Int. Cl.
*B29C 65/00*   (2006.01)
*B65H 19/18*   (2006.01)
(Continued)

(52) U.S. Cl.
CPC ......... *B65H 19/1852* (2013.01); *B65H 19/20* (2013.01); *B29C 65/22* (2013.01);
(Continued)

(58) Field of Classification Search
CPC ..... B29C 65/22; B29C 65/74; B29C 65/7433; B29C 65/7453; B29C 65/7894
See application file for complete search history.

(56) References Cited

U.S. PATENT DOCUMENTS 4,190,483 A * 2/1980 Ryan .................... B65H 19/20
242/552
5,411,223 A * 5/1995 Gatteschi ........... B65H 19/1852
242/554.2
(Continued)

FOREIGN PATENT DOCUMENTS

EP    0 847 948 A2   6/1998
EP    0 847 948 A3   8/1998
(Continued)

*Primary Examiner* — Philip C Tucker
*Assistant Examiner* — Nickolas R Harm
(74) *Attorney, Agent, or Firm* — Walter Ottesen, P.A.

(57) ABSTRACT

A device for splicing and continuously providing an outgoing film web includes a splicing unit for splicing a first or a second incoming film web to the outgoing film web, and a clamping unit and an intermediate film storage for the outgoing film web. The splicing unit includes a first sealing jaw with a first holding device for the outgoing film web, and a first cutting device for severing the outgoing film web in the region of the first sealing jaw. The splicing unit includes a second sealing jaw with a second holding device alternately for the first or the second incoming film web, and a second cutting device for severing this incoming film web. The sealing jaws with their respective holding devices can be displaced relative to one another out of the region of action of their first and second cutting devices into their mutual region of action.

11 Claims, 6 Drawing Sheets

(51) Int. Cl.
  *B65H 19/20*    (2006.01)
  *B29C 65/22*    (2006.01)
  *B29C 65/74*    (2006.01)
  *B29C 65/78*    (2006.01)

(52) U.S. Cl.
  CPC .......... *B29C 65/74* (2013.01); *B29C 65/7433* (2013.01); *B29C 65/7453* (2013.01); *B29C 65/7894* (2013.01); *B65H 2301/20* (2013.01); *B65H 2406/35* (2013.01); *B65H 2408/22* (2013.01)

(56) References Cited

U.S. PATENT DOCUMENTS

| | | | |
|---|---|---|---|
| 5,514,237 A * | 5/1996 | Emenaker | B29C 66/0044 156/159 |
| 5,618,377 A | 4/1997 | Kaneko et al. | |
| 8,146,328 B2 | 4/2012 | Tsuruta et al. | |
| 8,381,787 B2 | 2/2013 | Elsperger | |
| 2001/0016120 A1 * | 8/2001 | Hara | B65H 19/1852 396/387 |
| 2008/0202693 A1 * | 8/2008 | Torres Martinez | B29C 66/43 156/502 |
| 2012/0100978 A1 * | 4/2012 | Tommasi | B65H 19/1836 493/227 |
| 2016/0068361 A1 * | 3/2016 | Machamer | B65H 21/00 156/159 |
| 2016/0244290 A1 * | 8/2016 | De Marco | B65H 21/00 |
| 2018/0186590 A1 * | 7/2018 | Pedercini | B65H 19/1842 |

FOREIGN PATENT DOCUMENTS

| | | |
|---|---|---|
| EP | 2 103 525 A1 | 9/2009 |
| EP | 2 390 212 A2 | 11/2011 |
| EP | 2 390 212 A3 | 4/2012 |

* cited by examiner

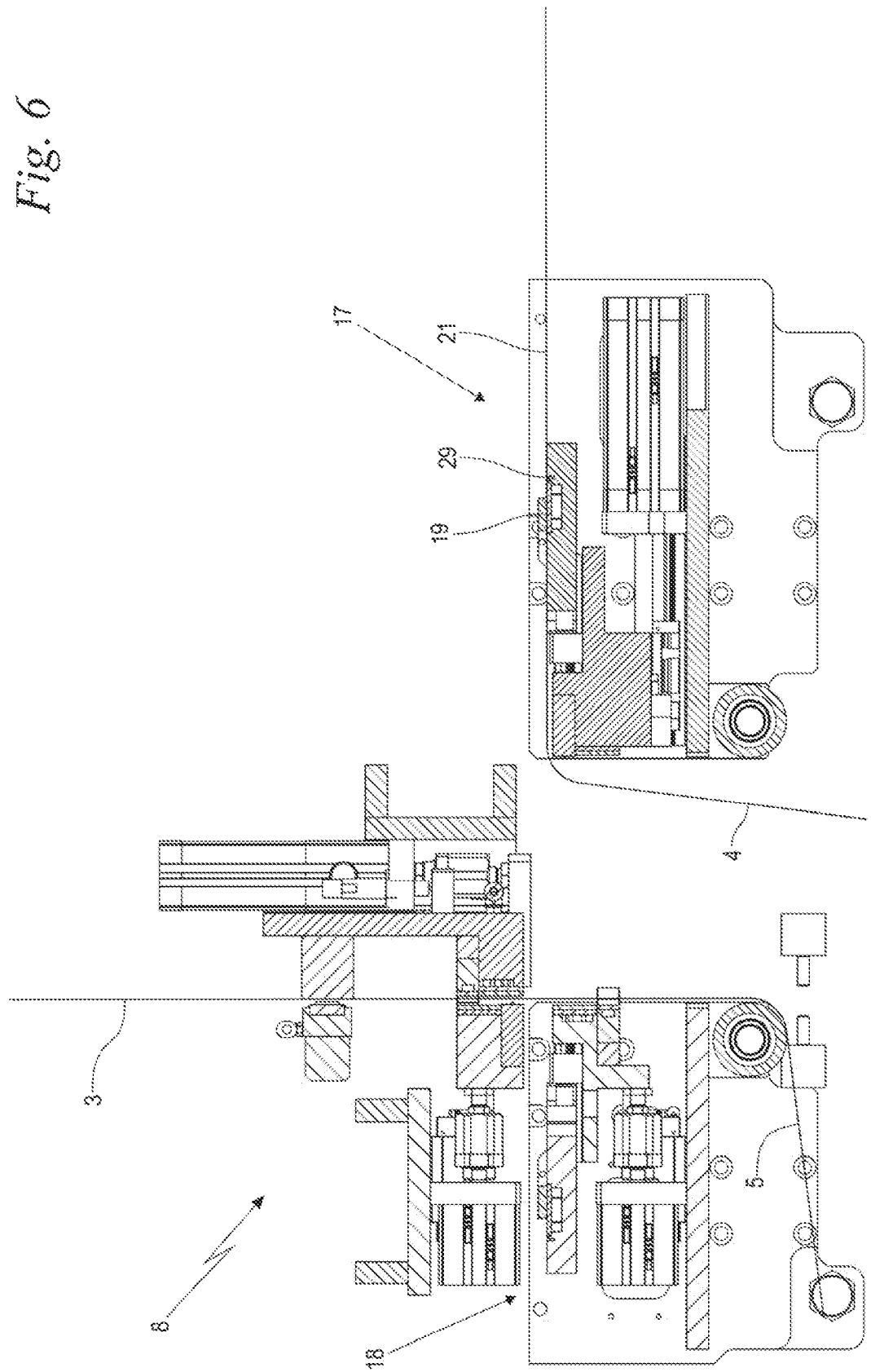

DEVICE AND METHOD FOR SPLICING AND CONTINUOUSLY PROVIDING A FILM WEB

CROSS REFERENCE TO RELATED APPLICATION

This application claims priority of European patent application no. 20 196 066.3, filed Sep. 14, 2020, the entire content of which is incorporated herein by reference.

TECHNICAL FIELD

The disclosure relates to a device and a method for splicing and continuously providing a film web.

BACKGROUND

In a wide variety of fields of use, film webs are processed in the form of endless material, as it were, and to this end are drawn off from a supply reel. In continuous processes, in which there is a dependence on a continuous supply of such a film web, a solution has to be kept ready for the event that a supply reel runs low and is to be replaced by another supply reel.

One known method includes the splicing of the old film web that is running low with the film web of a newly added reel. In this case, the end of the outgoing film web is connected to the beginning of a newly incoming film web in such a way that a virtually continuous film web is produced. This, including the splice point, can be fed into the downstream machine.

A particular usage situation is the production of filled film packs made from water-soluble film. For this purpose, a film web is guided through a machine in which it is deep-drawn to form receiving cavities. The receiving cavities are filled with a product in the form of laundry detergents or dishwashing detergents, for example, and then tightly sealed with a covering film. Finally, the various sealed cavities are isolated by cuts in such a way that portion packs are produced for use in dishwashing or washing machines, for example. Such a portion pack can be placed into the corresponding machine, the film dissolving on contact with the rinsing water and releasing the contents.

Meanwhile, the principle stated above per se has been known already for some time; more recently, continuous processes are being increasingly used, in which the water-soluble film is transported through the machine continuously, that is, not in cycles. The splicing which sometimes becomes necessary is carried out manually. To this end, according to the prior art the end portions of the new and/or the old film web are moistened and pressed against one another, as a result of which the two end portions are sealed to one another. Loose end pennants, which are manually secured with adhesive tape, remain to either side of the sealing point. The splice point created in such a way can indeed be fed into the downstream machine continuously and free of interruptions. A high-quality deep-drawing and sealing operation is, however, not possible in this region. As a consequence, the filling of the cavities has to be interrupted in the region of the splice point, since the filling of the unsealed pack units that are otherwise produced here would emerge and the machine would become contaminated.

Following the partially suspended filling operation is the isolating operation, where longitudinal and transverse cuts are continuously performed without using a cutting grid. By contrast to the filling, the cutting cannot be interrupted, since otherwise the pack units with or without filling cannot be removed from the machine. The splice point is thus cut in the same way as the film webs filled with the product, resulting in numerous difficulties. In particular, the loose end pennants of the splice region that are secured with adhesive tape form loose film scraps after being cut, which disperse in an uncontrolled manner in the machine and may result in blockages and other process disruptions through to the stoppage of the machine.

SUMMARY

It is an object of the disclosure to provide a device for splicing and continuously providing an outgoing film web, which device avoids the problems stated above.

The aforementioned object can, for example, be achieved by a device for splicing and continuously providing an outgoing film web. The device includes: a first film supply for feeding in a first incoming film web; a second film supply for feeding in a second incoming film web; a splicing unit configured to splice the first incoming film web or the second incoming film web to the outgoing film web; a clamping unit; an intermediate film storage for the outgoing film web, wherein the intermediate film storage is downstream of the clamping unit; the splicing unit including a first sealing jaw with a first holding device for the outgoing film web; the splicing unit further including a first cutting device configured to sever the outgoing film web in a region of the first sealing jaw; the splicing unit further including a second sealing jaw with a second holding device alternately for the first incoming film web or the second incoming film web; the splicing unit including a second cutting device configured to sever the first or the second incoming film web; the first cutting device defining a first region of action; the second cutting device defining a second region of action; and, the first sealing jaw with the first holding device and the second sealing jaw with the second holding device being configured to be displaceable relative to one another out of respective ones of the first region of action of their first and second cutting devices into a mutual region of action.

It is a further object of the disclosure to provide a method for operating such a device, which method allows the film web to be cut without problems, in particular in the region of the splice point.

The aforementioned object can, for example, be achieved by a method for operating a device for splicing and continuously providing an outgoing film web, wherein the splicing device includes a first film supply for feeding in a first incoming film web, a second film supply for feeding in a second incoming film web, a splicing unit configured to splice the first incoming film web or the second incoming film web to the outgoing film web, a clamping unit, an intermediate film storage for the outgoing film web, wherein the intermediate film storage is downstream of the clamping unit, the splicing unit including a first sealing jaw with a first holding device for the outgoing film web, the splicing unit further including a first cutting device configured to sever the outgoing film web in a region of the first sealing jaw, the splicing unit further including a second sealing jaw with a second holding device alternately for the first incoming film web or the second incoming film web; the splicing unit including a second cutting device configured to sever the first or the second incoming film web, the first cutting device defining a first region of action, the second cutting device defining a second region of action, and, the first sealing jaw with the first holding device and the second sealing jaw with the second holding device being configured to be displaceable relative to one another out of respective ones of the first region of action of their first and second cutting devices into a mutual region of action. The method includes the following method steps: during normal operation, continuously guiding one of the two incoming film webs in the form of the outgoing film web through the intermediate film storage and out of the device; as soon as it is detected that the one of the two incoming film webs is running low, securing the outgoing film web via the clamping unit and guiding the outgoing film web out of the device on an outlet side of the clamping unit via removal from the intermediate film storage; holding the outgoing film web on the first sealing jaw via the first holding device and severing the outgoing film web in the region of the first sealing jaw via the first cutting device; holding the other of the two incoming film webs on the second sealing jaw via the second holding device and severing the other of the two incoming film webs in the region of the second sealing jaw via the second cutting device; displacing the first sealing jaw with the severed outgoing film web, which is held on the first holding device, and the second sealing jaw with the severed second or first incoming film web, which is held on the second holding device, relative to one another out of respective ones of the first region of action and the second region of action into the mutual region of action, and the severed second or first incoming film web being spliced to the severed outgoing film web via the first sealing jaw and the second sealing jaw; and, reopening the clamping unit and continuing normal operation with the spliced outgoing film web.

Provided according to the disclosure is a device for splicing and continuously providing an outgoing film web, which device includes a first film supply for feeding in a first incoming film web, a second film supply for feeding in a second incoming film web, a splicing unit for splicing the first or the second incoming film web to the outgoing film web, and a clamping unit and an intermediate film storage, downstream of the clamping unit, for the outgoing film web. The splicing unit includes a first sealing jaw with a first holding device for the outgoing film web, and a first cutting device for severing the outgoing film web in the region of the first sealing jaw. The splicing unit furthermore includes a second sealing jaw with a second holding device alternately for the first or the second incoming film web, and a second cutting device for severing the first or the second film web. The first sealing jaw with the first holding device and the second sealing jaw with the second holding device can be displaced relative to one another out of the region of action of their first and second cutting devices into their mutual region of action.

In an associated method according to the disclosure, firstly, during normal operation, one of the two incoming film webs is guided continuously in the form of an outgoing film web through the intermediate film storage and out of the device. During this normal operation, the intermediate film storage merely constitutes a transit station and in all other respects does not have a function.

As soon as it is detected that this one of the two incoming film webs from which the outcoming film web is discharged is running low, the outgoing film web is secured via the clamping unit and guided out of the device on the outlet side of the clamping unit by being removed from the intermediate film storage. This interrupts the film supply on the inlet side of the clamping unit. On the outlet side of the clamping unit, the film supply or film discharge can be continuously continued by drawing off the amount of film necessary for this from the intermediate film storage. The capacity of the intermediate film storage is configured for operation within a time interval which is sufficient for the splicing operation described below.

Now, on the inlet side of the clamping unit, the outgoing film web is held on the first sealing jaw via the first holding device and severed in the region of the first sealing jaw via the first cutting device. The other of the two incoming film webs, that is, the newly added incoming film web, is held on the second sealing jaw via the second holding device and severed in the region of the second sealing jaw via the second cutting device. This results in only so much film material remaining at both sealing jaws as is necessary for the later sealing operation. Excess lengths of film are avoided completely or except for a technically insignificant remainder.

The first sealing jaw with the severed outgoing film web which is held on the first holding device and the second sealing jaw with the severed second or first incoming film web which is held on the second holding device are now displaced relative to one another out of the region of action of their first and second cutting devices, respectively, into their mutual region of action. The severed second or first incoming film web is then spliced to the severed outgoing film web via the interacting sealing jaws. The clamping unit is finally reopened and normal operation is continued with the spliced outgoing film web.

The use of two sealing jaws, which can be moved relative to one another, together with the associated holding devices makes it possible in a first relative position to dimensionally accurately sever the film webs while avoiding an excess length. In the second relative position, finally the two film webs are spliced by being sealed together, the splicing region being restricted to the immediate sealing region. The film web spliced in this way leads to an only very small region of disruption of the width of the actual sealing, without excessive lengths of film portions unnecessarily enlarging this area of disruption, in the downstream machine. The lack of excessive lengths of film end portions prevents the formation of loose scraps during the final cutting. Disruptive influences on or even stoppage times of the machine are reliably avoided.

Advantages of a device and method according to the disclosure are brought to bear in particular when the outgoing film web and the two incoming film webs are water-soluble and in particular made from PVOH (polyvinyl alcohol) and when the outgoing water-soluble film web is supplied to an in particular continuously operating machine for the production of filled water-soluble pouches.

For the relative movement described above of the two sealing jaws with their holding devices, a mounting which is movable with respect to the device frame for both or only for one of the sealing jaws may be expedient. In an embodiment, however, the first sealing jaw with the first holding device and the second cutting device can be displaced alternately into the region of action of the second sealing jaw with the second holding device. The second sealing jaw together with its holding device thus remains substantially in place, while depending on the method step either the second cutting device or the first sealing jaw, which is loaded with the outgoing film, is moved up. A high positional accuracy along with a low mechanical outlay can be achieved.

In an embodiment, the splicing unit has a first preparation table for the first incoming film web and a second preparation table for the second incoming film web, wherein the first and the second preparation table can be displaced back and forth between an active operating position and a passive preparation position. The first and the second preparation table have a respective holding device for a free end portion of the first or the second incoming film web and a severing region for severing the respective free end portion. The second cutting device is arranged in the severing region of the one of the two preparation tables, while a counter-holder for the second cutting device and, adjacent thereto, the second sealing jaw with the second holding device are arranged in the severing region of the other of the two preparation tables.

The displaceability back and forth of the preparation tables allows a change in position for the preparation of the splicing operation in such a way that there is a sufficient safety distance from the operating position in the preparation position. A new film web can be drawn in without disrupting the ongoing process and secured in a suitable preparation position on the preparation table. After being displaced back into the active operating position, everything is prepared for the actual beginning of the splicing operation. The splicing operation itself can then be carried out very quickly in fewer seconds, without the film supply being applied in the intermediate film storage. The cutting device and the counter-holder are situated ready for use directly opposite one another in the two severing regions of the preparation tables, with the result that the severing cut can be performed without delay and can be followed directly by a sealing operation.

In an embodiment, the holding device for the free end portion can be displaced relative to the severing region of the preparation table counter to a spring pretension. This achieves a plurality of aims. Firstly, the clamped film end is held under tension, and therefore the formation of folds or pockets is avoided. Secondly, the spring pretension can be utilized to draw off the end portion severed during the splicing operation and consequently reliably keep it away from the sealing region. In addition, the displaceability makes it possible in particular for a check to be carried out in conjunction with a suitable sensor as to whether film is actually present and available for a possible splicing operation.

In an embodiment, the preparation tables are mounted so as to be horizontally displaceable, while the first sealing jaw with the first holding device is mounted so as to be vertically displaceable. This results in simple movement kinematics which on the one hand enables the changeover between the active operating position and the passive preparation position, and on the other hand allows simple repositioning for the sealing operation.

Suitable blade systems come into consideration for the first or the second cutting device. The first and/or the second cutting device are/is preferably formed by a heating wire. In particular in conjunction with the already-mentioned PVOH film, a cleaner severing cut can be quickly obtained without the cut edge running the risk of fraying.

Mechanical clamping devices or the like may be expedient for the formation of the holding devices. Vacuum plates are preferably used to form the first and/or the second holding device. The respective film portion is drawn in with a high holding force in a planar and smooth manner via vacuum bores distributed areally in such plates, fold-free sealing faces without any disruption being provided for example by protruding mechanical grippers. The sealing operation itself may be performed in the immediate vicinity. Suitable pneumatic control means makes it possible to quickly bring about the holding action and similarly quickly also to deactivate it again.

BRIEF DESCRIPTION OF THE DRAWINGS

The invention will now be described with reference to the drawings wherein.

DESCRIPTION OF THE PREFERRED EMBODIMENTS

Figure 1:
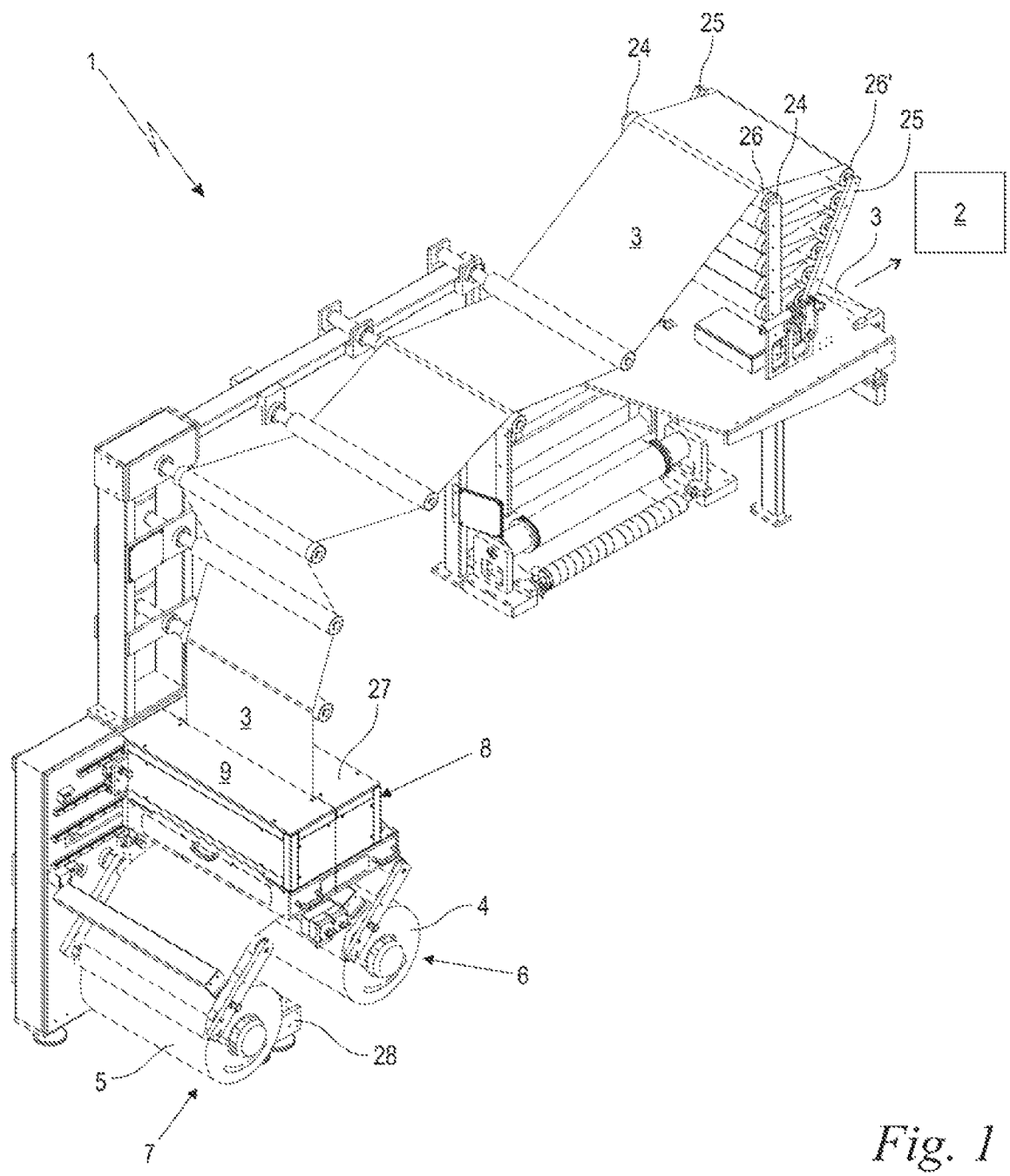
FIG. 1 shows a perspective illustration of a device, configured according to the disclosure, for splicing and continuously providing an outgoing film web, the device having a splicing unit and a downstream intermediate film storage.

FIG. 1 shows a perspective illustration of a device 1, configured according to the disclosure, for splicing and for continuously providing an outgoing film web 3. The term "outgoing" film web 3 chosen here means that the latter continuously exits the device 1 and in particular is supplied to a downstream machine 2.

In the present usage situation, the downstream machine 2 is known per se and therefore only illustrated as a block symbol. Here, it is a machine 2 in which individual portions of laundry detergents or dishwashing detergents with water-soluble film packs are produced from the film web 3 in a continuous, that is, non-intermittent process. Accordingly, the film web 3 processed here consists of a water-soluble material, specifically of PVOH. In the context of the disclosure, however, other film materials may also be used and other products may also be packed in this way.

The device 1 includes a first film supply 6 for feeding in a first incoming film web 4 and a second film supply 7 for feeding in a second incoming film web 5, both incoming film webs 4, 5 being held available in their respective film supply 6, 7 on reels and being drawn into the device 1 from there. The two incoming film webs 4, 5 also consist of PVOH.

The device 1 furthermore includes a splicing unit 8, a clamping unit 9 and an intermediate film storage 10, in the illustration according to FIG. 1, the splicing unit 8 and the clamping unit 9 being covered by a housing 27 and therefore not being visible. However, the splicing unit and clamping unit are shown below in FIGS. 2 to 6 and also described in more detail in this connection.

FIG. 1 shows a starting state, in which the first incoming film web 4 is guided through the splicing unit 8 and drawn off from it in the form of an outgoing film web 3. The outgoing film web 3 is supplied via deflecting and tensioning rollers to the intermediate film storage 10, which is connected downstream of the clamping unit 9 in the drawing-off direction. In the embodiment shown, the intermediate film storage 10 is in the form of what is known as a "film dancer" with a pair of stationary arms 24, with a pair of pivot arms 25 and with a row of reels 26, 26' fastened thereto. The outgoing film web 3 is guided around reels 26 of the stationary arms 24 and around reels 26' of the pivot arms 25 in alternation and in the process assumes a zigzag course.

The pair of pivot arms 25 holds its reels 26' at the greatest possible distance from the reels 26 of the stationary arms 24, and therefore a certain amount of the outgoing film web 3 is located in the film dancer or in the intermediate film storage 10.

During normal operation, the outgoing film web 3 is simply drawn off toward the machine 2 only through the intermediate film storage 10, without the amount of film located in the intermediate film storage 10 changing. However, as soon as the clamping unit 9, described in more detail further below, is activated and the outgoing film web 3 secured close to the splicing unit 8, for a limited period of time a limited amount of the outgoing film web 3 can continue to be supplied to the machine 2. In this respect, the outgoing film web 3 is removed from the intermediate film storage 10 and guided out of the device 1 toward the machine 2. During the removal, the pair of pivot arms 25 performs a pivoting movement in such a way that the distance of the associated reels 26" from the reels 26 of the stationary arms 24 decreases, and therefore a corresponding amount of the outgoing film web 3 becomes free and is available despite the activated clamping unit 9. The intermediate film storage 10 is configured for a removal duration which is sufficient to carry out the splicing operation described below. The embodiment shown is based here on a removal duration of approximately ten seconds. After splicing is carried out, the clamping unit 9 is released again in any case, and therefore the outgoing film web 3 can be drawn off again as before. At the same time, the pair of pivot arms 25 can also slowly be pivoted back again into the starting position shown, via which the intermediate film storage 10 is filled for the next splicing operation.

During normal operation, at some point the reel with the first incoming film web 4 runs low. Before this, in a timely manner, a reel with the second incoming film web 5 is provided in the second film supply 7. The reel is shown here already in a drawn-in state according to FIG. 3 and can be spliced to a free end of the outgoing film web 3 at a suitable point in time. As soon as this has happened, from now on the second incoming film web 5 is drawn off in the form of the outgoing film web 3 and supplied to processing in the machine 2. In alternation, the first film supply 6 with a new reel of the first incoming film web 4 then serves as a supply in order to be spliced to the outgoing film web 3 when the second incoming film web 5 is applied. Alternating splicing of the first or the second incoming film web 4, 5 makes it possible to provide a continuous outgoing film web 3, to draw it off and to supply it to the downstream machine 2 without interruptions.

The fill state of the two reels with the first or second incoming film webs 4, 5 is checked in the embodiment shown by a reel diameter detecting instrument 28, with the result that when a certain minimum diameter is not reached, the splicing operation which will soon become necessary can be prepared and initiated.

Figure 2:
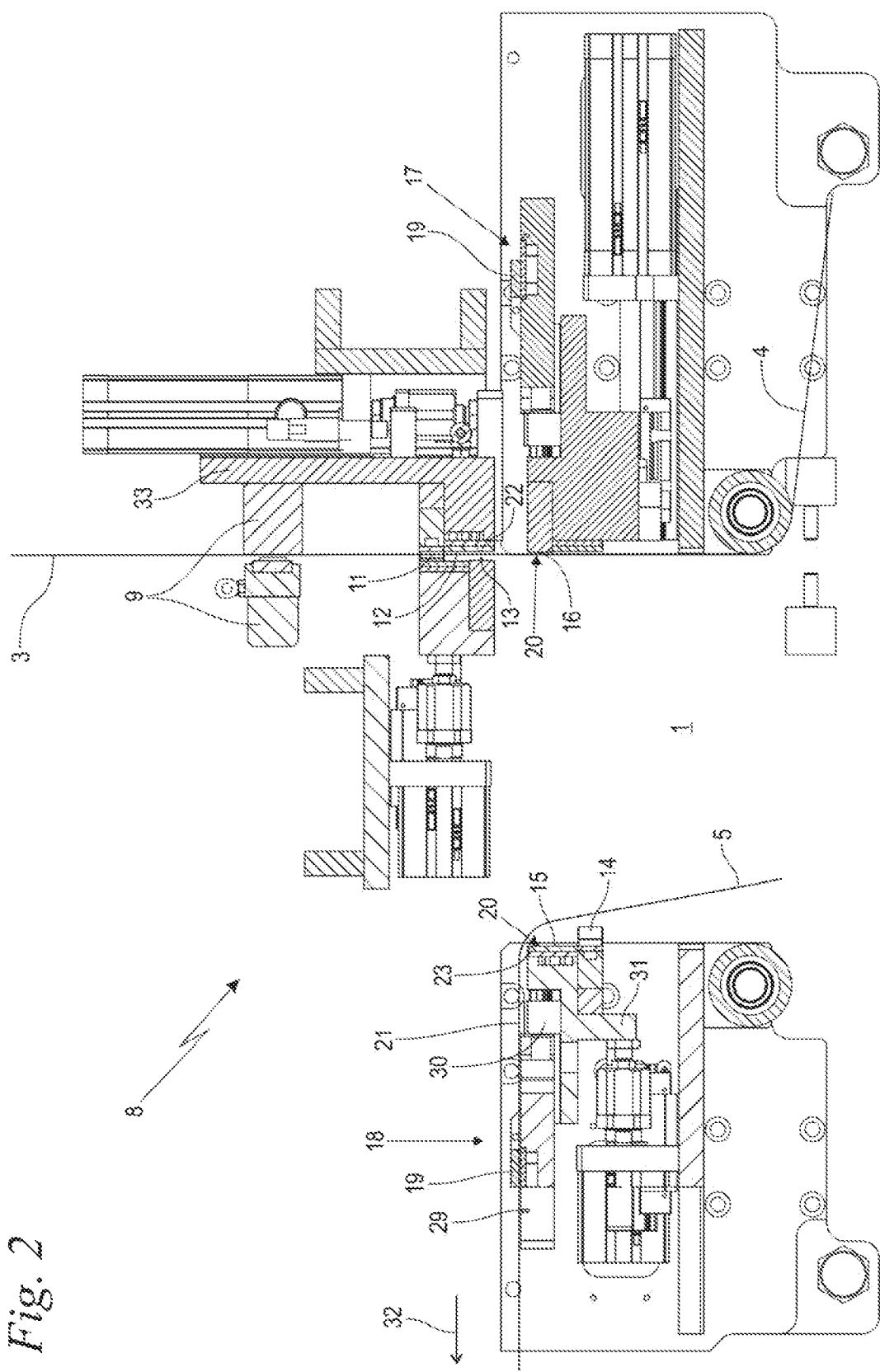
FIG. 2 shows a partially sectional illustration of the device according to FIG. 1 in the region of its splicing unit with a preparation table which has been extended into its passive preparation position.

FIG. 2 shows a partially sectioned view of the region of the splicing unit 8 of the device 1 according to FIG. 1, where here and also in the subsequent figures the housing 27 according to FIG. 1 is not illustrated for the purpose of better clarity. In order to reach the starting state according to FIG. 1, preparatory activities are carried out which are described in more detail below, in particular with reference to FIG. 2.

According to the right-hand side of FIG. 2, the first incoming film web 4 coming from the first film supply 6 (FIG. 1) is deflected vertically upward around a deflecting roller and guided through the splicing unit 8 from bottom to top. There, the first incoming film web exits upwardly in the form of an outgoing film web 3 and then passes a clamping unit 9 downstream of the splicing unit 8. Neither the splicing unit 8 nor the clamping unit 9 are activated in this state, and therefore the outgoing film web 3 is fed continuously from the incoming film web 4 and can be continuously drawn off in a manner corresponding to the illustration according to FIG. 1.

The device 1 includes, as part of the splicing unit 8, a first preparation table 17 for the first incoming film web 4 and a second preparation table 18 for the second incoming film web 5. A further part of the splicing unit 8 is located above the two preparation tables 17, 18 and includes a first sealing jaw 11 with a first holding device 12 for the outgoing film web 3 and a first cutting device 13 for severing the outgoing film web 3 in the region of the first sealing jaw 11. Located on the right of the outgoing film web 3 are the first sealing jaw 11 and directly below it, that is, on the inlet side thereof, the first holding device 12 for the outgoing film web 3. The first holding device 12 is a vacuum plate, which can draw in and hold the outgoing film web 3 via a grid of vacuum bores when a vacuum is correspondingly applied. Located directly below this in turn, that is, on the inlet side thereof, is a counter-holder 22 for the first cutting device 13, which is configured here as a heating wire and for its part is positioned opposite the other side, that is, the left-hand side here, of the outgoing film web 3. The first sealing jaw 11, the first holding device 12 and the first cutting device 13 including its associated counter-holder 22 extend over the entire width of the outgoing film web 3, this incidentally similarly also applying to the clamping unit 9 located thereabove. One configuration characteristic is also that the first sealing jaw 11 and the first holding device 12 are located on a carrier 33 and can be displaced vertically on a linear guide together with the carrier and the clamping unit 9 likewise fastened thereto.

Figure 3:
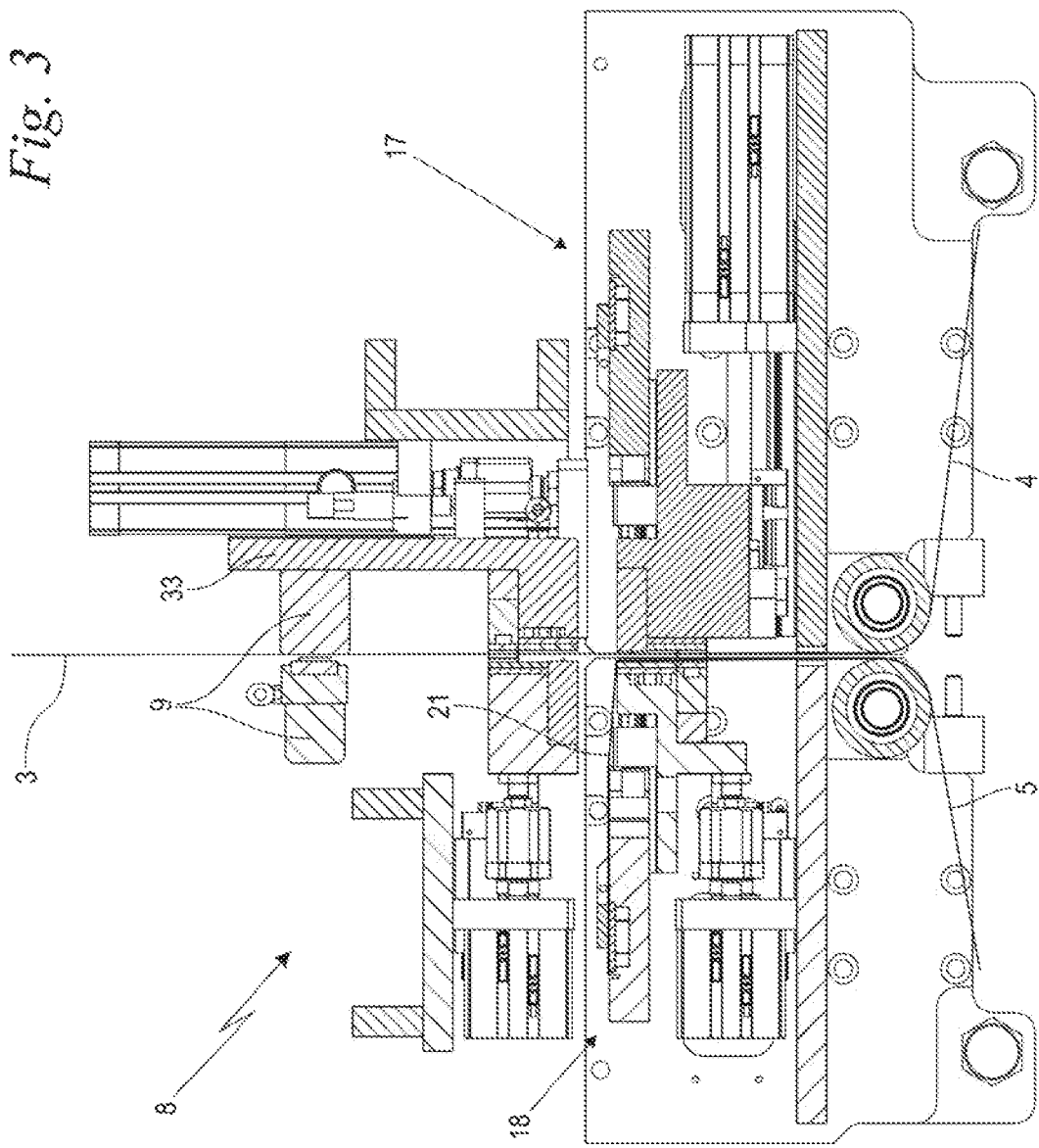
FIG. 3 shows the arrangement according to FIG. 2 with both preparation tables in their active operating position and in the prepared state for a subsequent splicing operation.

Apart from the differences described in more detail below, the two preparation tables 17, 18 have a mirror-symmetrical configuration in relation to one another and otherwise are the same. The first preparation table 17 and the second preparation table 18 can be displaced back and forth in a horizontal direction between an active operating position and a passive preparation position. In FIG. 3, both preparation tables 17, 18 have assumed their active operating position, in which they are situated directly next to one another. In the illustration according to FIG. 2, the left, second preparation table 18 is displaced to the left into its passive preparation position, while the right, first preparation table 17 is left in its active operating position. The converse case is illustrated in FIG. 6: there, the right, first preparation table 17 is displaced to the right into its passive preparation position, while the left, second preparation table 18 has maintained its active operating position.

Both preparation tables 17, 18 have a respective holding device 19 for a free end portion 21 of the first and the second incoming film web 4, 5, respectively, and a severing region 20 for severing this respective free end portion 21. The severing regions 20 of the two preparation tables 17, 18 are situated directly opposite one another. Here, the two incoming film webs 4, 5 are guided substantially vertically.

In the passive preparation position according to FIG. 2, as a preparatory measure for a later splicing operation, the free end portion 21 of the second incoming film web 5 is drawn out of the first film supply 6 (FIG. 1), drawn upward past the severing region 20 of the second preparation table 18, then guided horizontally to the left through the holding device 19 and finally secured in the holding device 19, which here includes two clamping jaws. Located on the outlet side of the holding device 19 is also a cutting groove 29 which runs transversely over the entire film width. A blade can be drawn through the cutting groove 29 in order to sever an excess end length of the end portion 21.

The holding device 19 can be displaced horizontally relative to a base body 31 of the preparation table 18 against a spring pretension, the spring pretension acting on the holding device 19 in the direction of an arrow 32 pointing away from the severing region 20. The end portion 21 clamped in the holding device 19 is thus drawn away from the severing region 20. As soon as the free end portion 21 is clamped in the holding device 19, the second incoming film web 5 is rolled back onto the film reel of the second film supply 7 until a sufficiently high spring tension or a sufficiently great spring travel has been set at the holding device 19. The spring force and/or spring travel may be detected by an optional sensor 30, which when the desired target value is reached generates a suitable signal and thus indicates that the desired pretension in the end portion 21 has been reached. Since without this end portion 21 no such pretension can be generated, the sensor 30 can also be used to check for the presence of the end portion 21.

Further configuration features of the two preparation tables 17, 18 can be described as follows: the preparation tables 17, 18 are provided, among other things, with a second sealing jaw 14, a second holding device 15 and a second cutting device 16. The arrangement of the second sealing jaw 14, the second holding device 15 and the second cutting device 16 is rotated by 180° in comparison with the arrangement of the first sealing jaw 11, first holding device 12 and first cutting device 13, and otherwise has the same construction.

Located below the severing region 20 of the left, second preparation table 18 is the second sealing jaw 14, which extends transversely over the entire width of the second incoming film web 5. Located above the severing region, that is, on the outlet side of the second sealing jaw 14 and directly adjacent to it, is the second holding device 15, likewise configured in the form of a vacuum plate, for the second incoming film web 5, which holding device likewise extends over the entire width of the second incoming film web. Located directly above the second holding device 15, that is, directly at the outlet side thereof, is also a counter-holder 23 for the second cutting device 16, which is located in the oppositely situated severing region 20 of the adjacent first preparation table 17. The second cutting device 16 here is also in the form of a heating wire which is indicated and extends over the entire width of the incoming film webs 4, 5 in the same way as the oppositely situated counter-holder 23. By contrast to the second preparation table 18, the first preparation table 17 does not have a sealing jaw or a holding device in this region.

With reference to the physical features described above in particular in conjunction with FIGS. 1 and 2, the function of the device 1 and the method sequence according to the disclosure are as follows: as already mentioned in conjunction with FIG. 1, the starting situation in which the outgoing film web 3 is continuously fed from the first incoming film web 4 is taken as a basis by way of example here. To prepare for a requirement for a splicing operation that is becoming apparent, it is therefore the case that firstly, as already described above, the free end portion 21 of the second incoming film web 5 is clamped in the holding device 19 and pretensioned counter to the previously already described spring force. All of this takes place in the passive preparation position of the second preparation table 18 according to FIG. 2, while the outgoing film web 3 is drawn off from the first film supply 6 (FIG. 1) with the first incoming film web 4 continuously and without interruptions.

After the clamping in and pretensioning according to FIG. 2, the second preparation table 18 is displaced back into its active operating position, as illustrated in FIG. 3. In the prepared state according to FIG. 3, normal operation, in which the outgoing film web 3 is continuously drawn off, can continue to be carried out. However, as soon as the reel diameter detecting instrument 28 (FIG. 1) signals that the film reel of the first film supply 6 is running low, the actual splicing operation begins, as follows.

Figure 4:
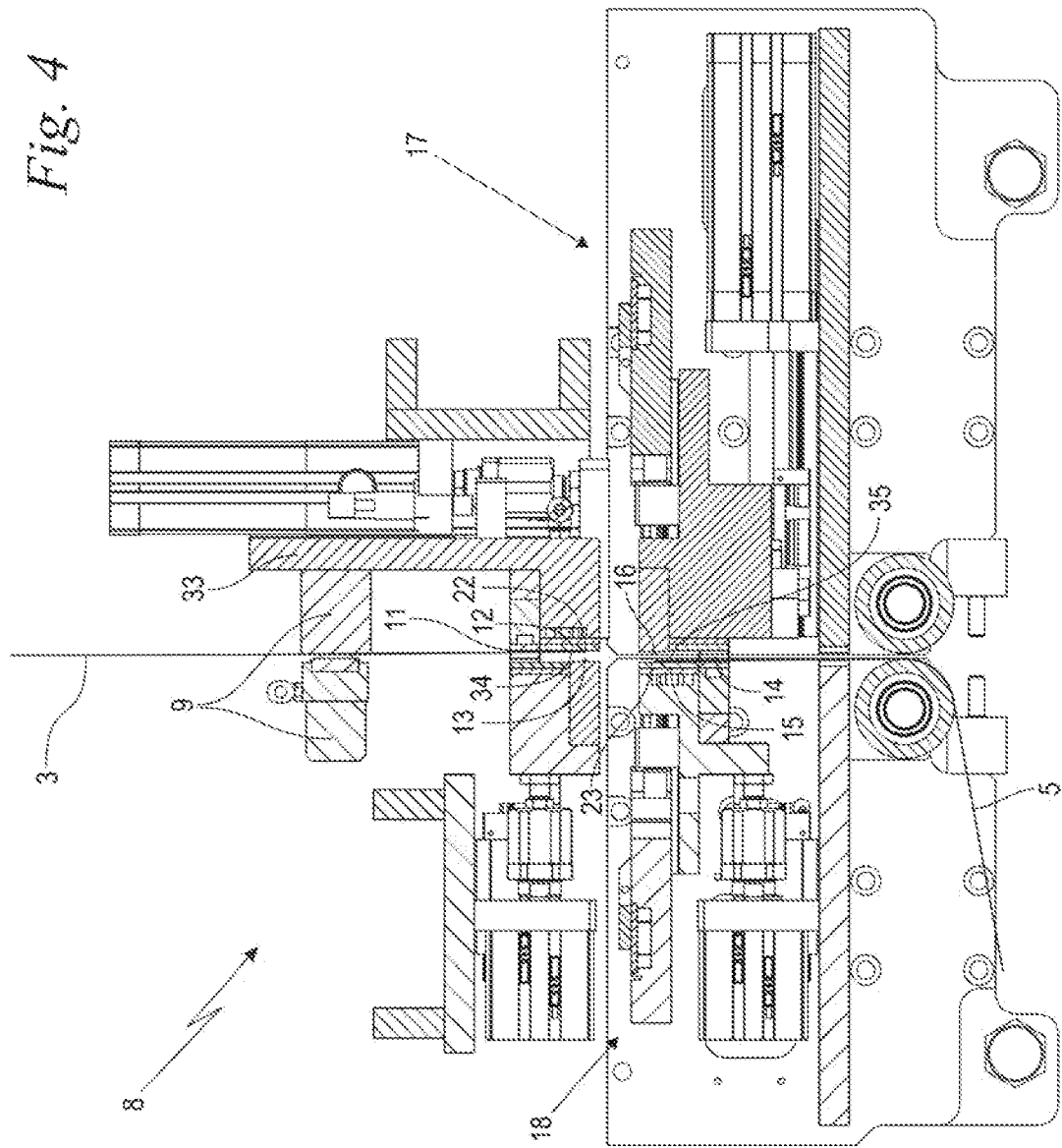
FIG. 4 shows the arrangement according to FIG. 3 at the beginning of the splicing operation with severed end portions of the film webs.

Firstly, according to the illustration of FIG. 4, the outgoing film web 3 is secured via the clamping unit 9 by moving the clamping jaws of the clamping unit 9 together, with the outgoing film web 3 interposed between them. The further film supply from the first incoming film web 4 is interrupted in this way, while in a manner corresponding to the description above relating to FIG. 1, over a limited period of time the outgoing film web 3 is removed from the intermediate film storage 10 and supplied to the downstream machine 2.

As soon as the outgoing film web 3 is secured via the clamping unit 9, use is made of the first cutting device 1. A vacuum is applied to the first holding device 12, with the result that the outgoing film web 3 is held directly on the inlet side of the first sealing jaw 11 in a manner corresponding to the illustration according to FIG. 4. Then, the outgoing film web 3 is severed along its entire width via the first cutting device 13 in the region of the first sealing jaw 11, more precisely on the inlet side of the first sealing jaw 11 and on the inlet side of the first holding device 12, by heating up the cutting device 13 in the form of the heating wire and pressing it against the counter-holder 22, with the outgoing film web 3 interposed between them. The now-severed film part, located therebelow, in the form of the first incoming film web 4 (FIG. 3) is now drawn back into the first film supply 6 (FIG. 1) and is consequently removed from the region of the splicing unit 8 according to the illustration of FIG. 4. Merely a free end 34 of the outgoing film web 3 remains adhered to the first holding device 12.

Furthermore, now use is also made of the second cutting device 16. In a similar way to the method step described above, firstly a vacuum is applied to the second holding device 15, with the result that the corresponding region of the second incoming film web 5 adheres thereto or is held thereon over its entire surface area. With the second incoming film web 5 interposed between them, now the second cutting device 16 is activated by heating up the heating wire and moving it against the associated counter-holder 23. Consequently, the second incoming film web 5 is severed along its entire width, such that its clamped-in end portion 21 is severed and drawn off along the spring travel described above. The severed end portion 21 (FIG. 2) can be removed and in this way is taken away from the region of the splicing unit 8 in a manner corresponding to the illustration according to FIG. 4. Merely a free end 35 of the second incoming film web 5 that is formed by the severing cut is held directly on the outlet side of the second sealing jaw 14 on the second holding device 15.

Figure 5:
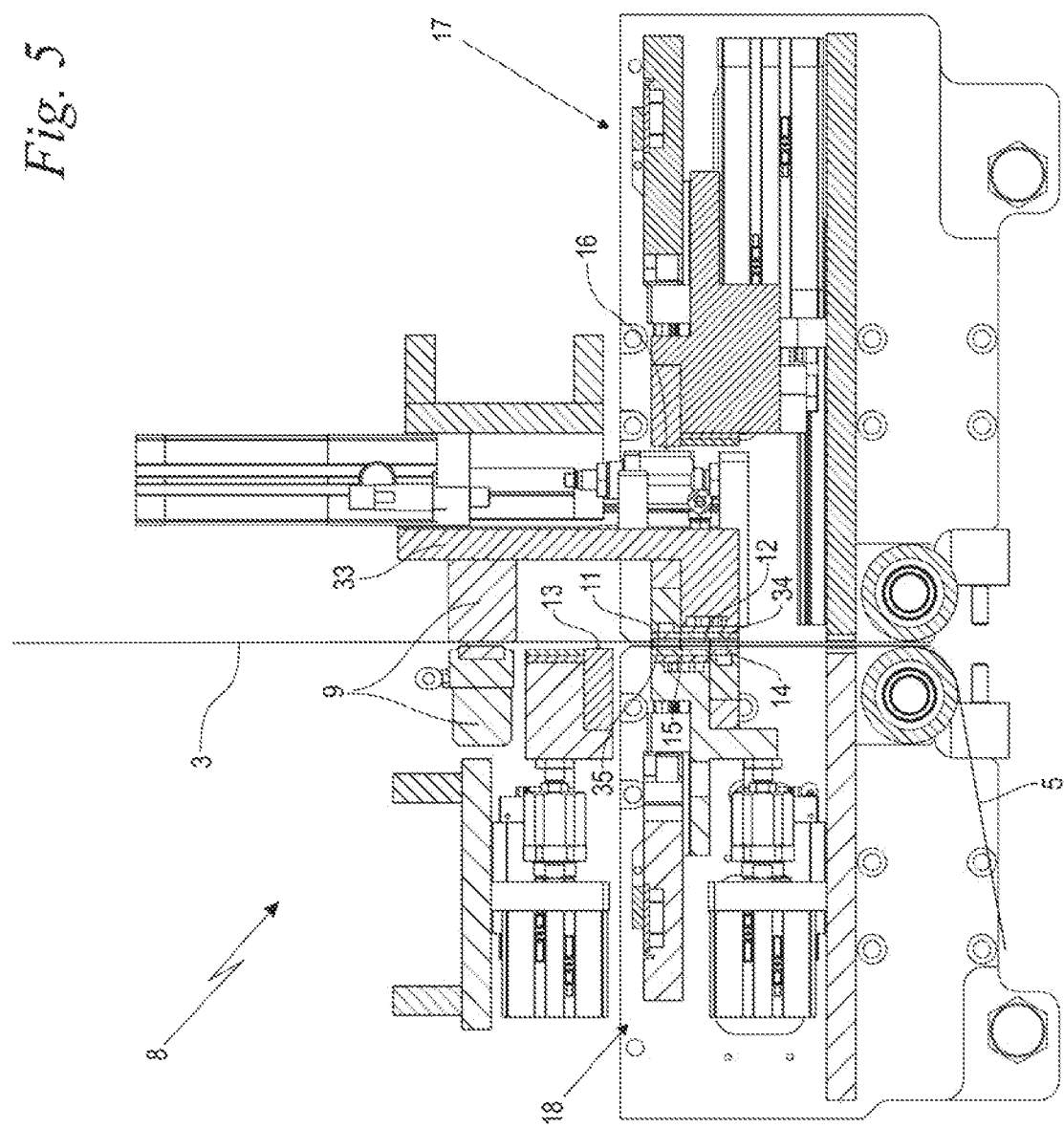
FIG. 5 shows the same arrangement with a cutting device which can be displaced to either side and with sealing jaws which have been moved together; and, FIG. 6 shows the above arrangement in an alternative state to FIG. 2, in which the other preparation table has been drawn into its passive preparation position.

Since now the prepared state according to FIG. 4 has been reached, the splicing unit 8 is reconfigured according to the illustration of FIG. 5. In the previous state according to FIG. 4, the first sealing jaw 11 with the severed outgoing film web 3 held on the associated first holding device 12 is still located in the region of action of its associated first cutting device 13. The same thing analogously also applies to the second sealing jaw 14 with the second holding device 15 associated with it and the severed second incoming film web 5 which is held thereon and is located in the region of action of the associated second cutting device 16. In the course of the transition to the configuration according to FIG. 5, a relative displacement between the first sealing jaw 11 with the outgoing film web 3 held in the region thereof and the second sealing jaw 14 with the second incoming film web 5 held in the region thereof now takes place. The result of this relative movement is that the first and second sealing jaws are removed from the region of action of their associated first and second cutting devices 13, 16 and pass into their mutual region of action.

In the embodiment shown, according to FIG. 5, to this end firstly the first preparation table 17 is drawn away from the active operating position into the passive preparation position, with the result that the second cutting device 16 located thereon is taken away from the region of the second sealing jaw 14, the second holding device 15 and the end of the second incoming film web 5 that is held on the holding device. Subsequently, the carrier 33 together with the clamping unit 9 is displaced downward, a corresponding piece of the outgoing film web 3 being drawn back out of the intermediate film storage 10 (FIG. 1). Together with this displacement travel, the unit having the first sealing jaw 11, the first holding device 12 and the free end 34 of the outgoing film web 3 adhering to the holding device is drawn far enough downward that it comes to lie directly in congruence with the unit having the second sealing jaw 14, the second holding device 15 and the free end of the second incoming film web 5 adhering to the holding device.

In this state, illustrated in FIG. 5, the two sealing jaws 11, 14 are now activated, with the result that the free end 35 of the second incoming film web 5 is sealed onto the outgoing film web 3 and the free end 34 of the outgoing film web 3 is sealed onto the second incoming film web 5. The two sealing points are at a small distance from one another, with the result that the free ends 34, 35 overlap a little, but themselves are sealed on fixedly without a noteworthy excess length in the process. No free film ends, or at most technically meaningless free film ends, that could otherwise come free later in the process in the form of free film scraps remain.

In the embodiment shown, the two sealing jaws 11, 14 overlap at a distance apart from one another. It may also be expedient, however, for both sealing jaws 11, 14 to meet one another directly, with the result that only a continuous seal seam is produced. In this case, it may be sufficient when only one of the two sealing jaws 11, 14 is heated up, while the oppositely situated sealing jaw remains thermally passive and acts merely as a counter-holder.

In any case, the splicing operation is now ended inasmuch as the second incoming film web 5 by way of its free end 35 is spliced to the free end 34 of the outgoing film web 3. The clamping unit 9 is now opened. The outgoing film web 3 is now again during normal operation drawn out of the device 1 and supplied to the machine 2 (FIG. 1). As soon as the splice point mentioned is drawn out, the outgoing film web 3 is supplied from the second film supply 7 with the corresponding second incoming film web 5. Moreover, the carrier 33 and the first preparation table 17 are also displaced back out of their sealing position according to FIG. 5 and into their normal operating position according to FIG. 3. The same starting situation is then produced as was described further above in conjunction with FIGS. 1 and 2. The only difference is that the outgoing film web 3 is no longer drawn out from the first film supply 6, but from the second film supply 7.

If now at some point the supply in the second film supply 7 (FIG. 1) runs low, in a similar way to the illustration according to FIG. 2 preparations are carried out anew for the next splicing operation, for which details are illustrated in FIG. 6: here, the second preparation table 18 remains in its active operating position, while the first preparation table 17 is drawn horizontally outward into its passive preparation position. In a similar way to the illustration according to FIG. 2, the end portion 21 of the newly inserted, first incoming film web 5 is now clamped in at the holding device 19 and placed under pretension. Subsequently, the first preparation table 17 is displaced back into its active operating position, resulting in an operating state similar to FIG. 3. Proceeding from this, in a similar way to the method described above, the next splicing operation is now carried out with the sole difference that now a free end of the first incoming film web 4 is spliced to the free end 34 of the outgoing film web 3. By alternately splicing either the first incoming film web 4 or the second incoming film web 5, it is possible to provide an outgoing film web 3 continuously and free of interruptions, the only occasionally occurring splice points of the outgoing film web having a minimized influence on reprocessing in the downstream machine 2 (FIG. 1) on account of their nature.

It is understood that the foregoing description is that of the preferred embodiments of the invention and that various changes and modifications may be made thereto without departing from the spirit and scope of the invention as defined in the appended claims.

What is claimed is:

1. A device for splicing and continuously providing an outgoing film web, the device comprising:
    a first film supply for feeding in a first incoming film web;
    a second film supply for feeding in a second incoming film web;
    a splicing unit configured to splice the first incoming film web or the second incoming film web to the outgoing film web;
    a clamping unit;
    an intermediate film storage for the outgoing film web, wherein said intermediate film storage is downstream of said clamping unit;
    said splicing unit including a first sealing jaw with a first holding device for the outgoing film web;
    said splicing unit further including a first cutting device configured to sever the outgoing film web in a region of said first sealing jaw;
    said splicing unit further including a second sealing jaw with a second holding device alternately for said first incoming film web or said second incoming film web;
    said splicing unit including a second cutting device configured to sever said first or said second incoming film web;
    said first cutting device defining a first region of action;
    said second cutting device defining a second region of action; and,
    said first sealing jaw with said first holding device and said second sealing jaw with said second holding device being configured to be displaceable relative to one another out of corresponding ones of said first region of action of said first cutting device and said second region of action of said second cutting device into a mutual region of action.

2. The device of claim 1, wherein said second sealing jaw has a second sealing jaw region of action; and, said first sealing jaw with said first holding device and said second cutting device are configured to be alternately displaceable into said second sealing jaw region of action with said second holding device.

3. The device of claim 1, wherein said splicing unit has a first preparation table for said first incoming film web and a second preparation table for said second incoming film web; said first preparation table and said second preparation table are configured to be displaceable back and forth between an active operating position and a passive preparation position; said first preparation table and said second preparation table each have a holding device for a free end portion of said first incoming film web or said second incoming film web; said first preparation table has a first severing region for severing the free end portion; said second preparation table has a second severing region for severing the free end portion; and, said second cutting device is arranged in one of said first severing region and said second severing region, and a counter-holder for said second cutting device and, adjacent to said counter-holder, said second sealing jaw with said second holding device are arranged in another one of said first severing region and said second severing region.

4. The device of claim 3, wherein each of said holding devices for the free end portion can be displaced relative to a corresponding one of said first severing region and said second severing region counter to a spring pretension.

5. The device of claim 3, wherein said first preparation table and said second preparation table are each mounted so as to be horizontally displacable; and, said first sealing jaw with said first holding device is mounted so as to be vertically displaceable.

6. The device as claimed in claim 1, wherein at least one of said first cutting device and said second cutting device is formed by a heating wire.

7. The device as claimed in claim 1, wherein at least one of said first holding device and said second holding device is formed by a vacuum plate.

8. A method for operating a device for splicing and continuously providing an outgoing film web, wherein the splicing device includes a first film supply for feeding in a first incoming film web, a second film supply for feeding in a second incoming film web, a splicing unit configured to splice the first incoming film web or the second incoming film web to the outgoing film web, a clamping unit, an intermediate film storage for the outgoing film web, wherein the intermediate film storage is downstream of the clamping unit, the splicing unit including a first sealing jaw with a first holding device for the outgoing film web, the splicing unit further including a first cutting device configured to sever the outgoing film web in a region of the first sealing jaw, the splicing unit further including a second sealing jaw with a second holding device alternately for the first incoming film web or the second incoming film web; the splicing unit including a second cutting device configured to sever the first or the second incoming film web, the first cutting device defining a first region of action, the second cutting device defining a second region of action, and, the first sealing jaw with the first holding device and the second sealing jaw with the second holding device being configured to be displaceable relative to one another out of corresponding ones of the first region of action of said first cutting device and said second region of action of said second cutting device into a mutual region of action, wherein the method comprises the following method steps:

during normal operation, continuously guiding one of the two incoming film webs in the form of the outgoing film web through the intermediate film storage and out of the device for splicing and continuously providing an outgoing film web;

detecting that the one of the two incoming film webs is running low;

as soon as it is detected that the one of the two incoming film webs is running low, securing the outgoing film web via the clamping unit and guiding the outgoing film web out of the device on an outlet side of the clamping unit via removal from the intermediate film storage;

holding the outgoing film web on the first sealing jaw via the first holding device and severing the outgoing film web in a region of the first sealing jaw via the first cutting device;

holding the other of the two incoming film webs on the second sealing jaw via the second holding device and severing the other of the two incoming film webs in the region of the second sealing jaw via the second cutting device;

displacing the first sealing jaw with the severed outgoing film web, which is held on the first holding device, and the second sealing jaw with the severed second or first incoming film web, which is held on the second holding device, relative to one another out of respective ones of the first region of action and the second region of action into the mutual region of action, and the severed second or first incoming film web being spliced to the severed outgoing film web via the first sealing jaw and the second sealing jaw; and, reopening the clamping unit and continuing normal operation with the spliced outgoing film web.

9. The method of claim 8, wherein the outgoing film web and the two incoming film webs are water-soluble, and, the outgoing water-soluble film web is supplied to a machine for the production of filled water-soluble pouches.

10. The method of claim 9, wherein the two incoming film webs are made from PVOH.

11. The method of claim 9, wherein the machine is continuously operating.

* * * * *